United States Patent [19]

Hantz et al.

[11] Patent Number: 4,889,042
[45] Date of Patent: Dec. 26, 1989

[54] ELECTRIC HOUSEHOLD APPLIANCE COMBINING A TOASTER AND AN OVEN

[75] Inventors: Dominique Hantz; Dominique Antoine, both of Vagney; Bruno Jackowski, Fontaine-les-Dijon, all of France

[73] Assignee: SEB S.A., Selongey, France

[21] Appl. No.: 246,660

[22] PCT Filed: Dec. 23, 1987

[86] PCT No.: PCT/FR87/00513
 § 371 Date: Aug. 2, 1988
 § 102(e) Date: Aug. 2, 1988

[87] PCT Pub. No.: WO88/04908
 PCT Pub. Date: Jul. 14, 1988

[30] Foreign Application Priority Data

Dec. 26, 1986 [FR] France ................ 86 18201

[51] Int. Cl.$^4$ ............................................. A47J 37/08
[52] U.S. Cl. ........................................ 99/340; 99/339; 99/385; 99/390; 99/337
[58] Field of Search ............... 99/389, 385, 391, 339, 99/340, 325, 337, 396; 219/412, 413, 414, 518

[56] References Cited

U.S. PATENT DOCUMENTS

| | | | |
|---|---|---|---|
| 1,772,171 | 8/1930 | Wells | 99/391 X |
| 1,955,867 | 4/1934 | Wilkie et al. | 99/339 X |
| 1,996,297 | 4/1935 | Langenfield | 99/339 X |
| 2,089,315 | 8/1937 | Wheeler | 99/339 X |
| 2,092,226 | 9/1937 | Simons, Jr. | 99/340 X |
| 2,345,769 | 4/1944 | Osrow | 99/327 |
| 2,368,440 | 1/1945 | Barker | 99/339 |
| 2,711,684 | 6/1955 | Taylor | 99/340 |
| 2,920,551 | 1/1960 | Schmall | 99/329 |
| 3,823,658 | 7/1974 | Pinchot | 99/340 |

FOREIGN PATENT DOCUMENTS

| | | | |
|---|---|---|---|
| 2453080 | 5/1975 | Fed. Rep. of Germany | 99/385 |
| 1320733 | 6/1961 | France | 99/391 |
| 2103875 | 4/1972 | France. | |
| 2250499 | 6/1975 | France. | |
| 2454057 | 12/1980 | France | 99/340 |
| 2197578 | 5/1988 | United Kingdom | 99/385 |

*Primary Examiner*—Stephen Marcus
*Assistant Examiner*—Christine A. Peterson
*Attorney, Agent, or Firm*—Young & Thompson

[57] ABSTRACT

Electric household appliance (1) which combines toasting of bread (A) and cooking or heating of dishes (B) by an appliance (1) which comprises separate elongated compartments (2, 3) extending in parallel relation respectively for toasting (2) and cooking (3), each of these compartments being provided with its own heater (15, 16). The appliance (1) is provided with bearings (4a, 4b; 5a, 5b) for tilting the compartments (2, 3) into positions located substantially at right angles to each other and corresponding to their normal respective operating positions. Utilization for toasting and for cooking all food products.

10 Claims, 3 Drawing Sheets

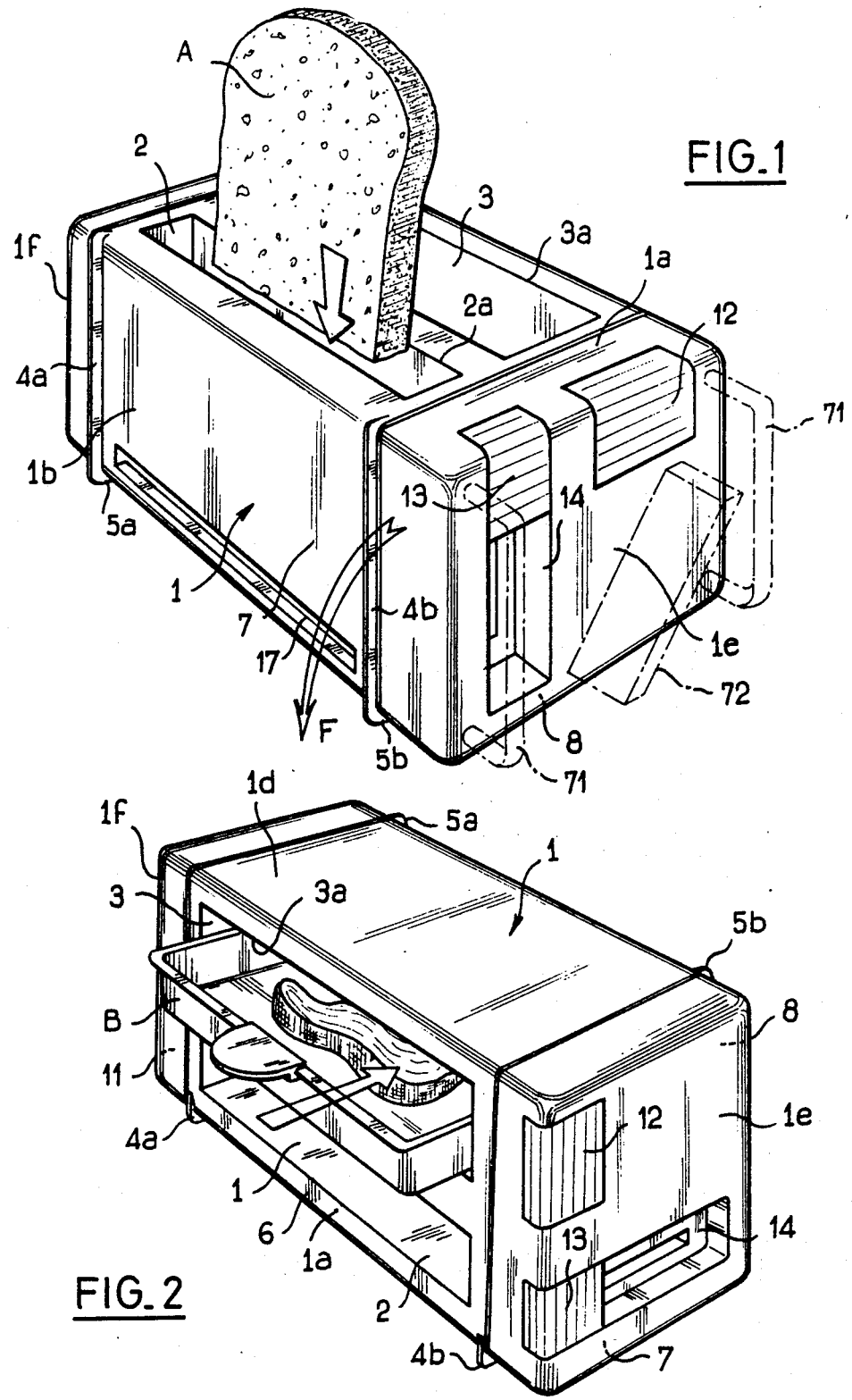

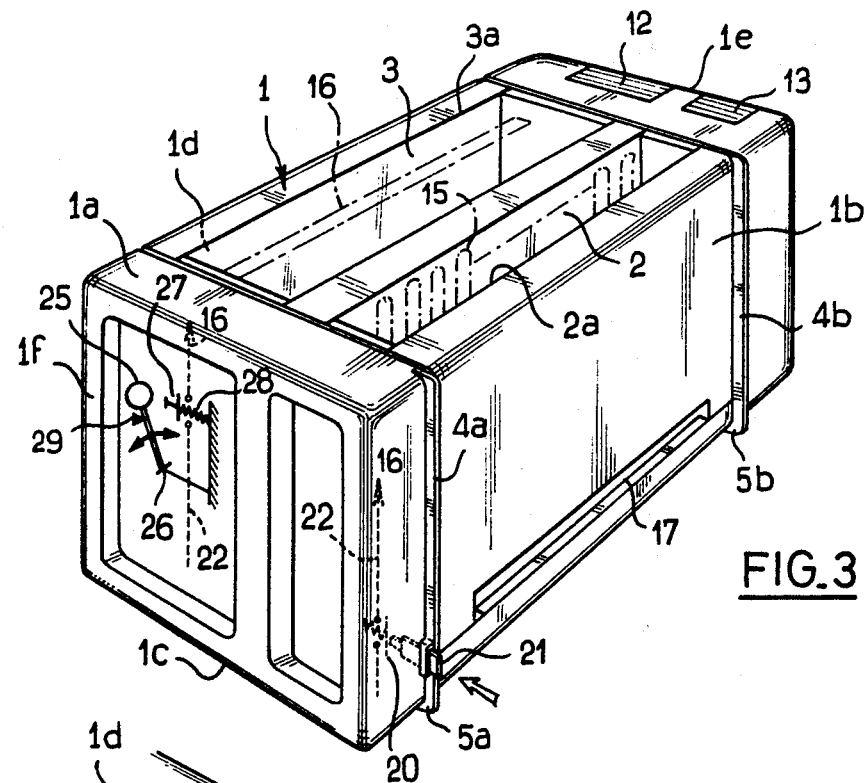
FIG. 3
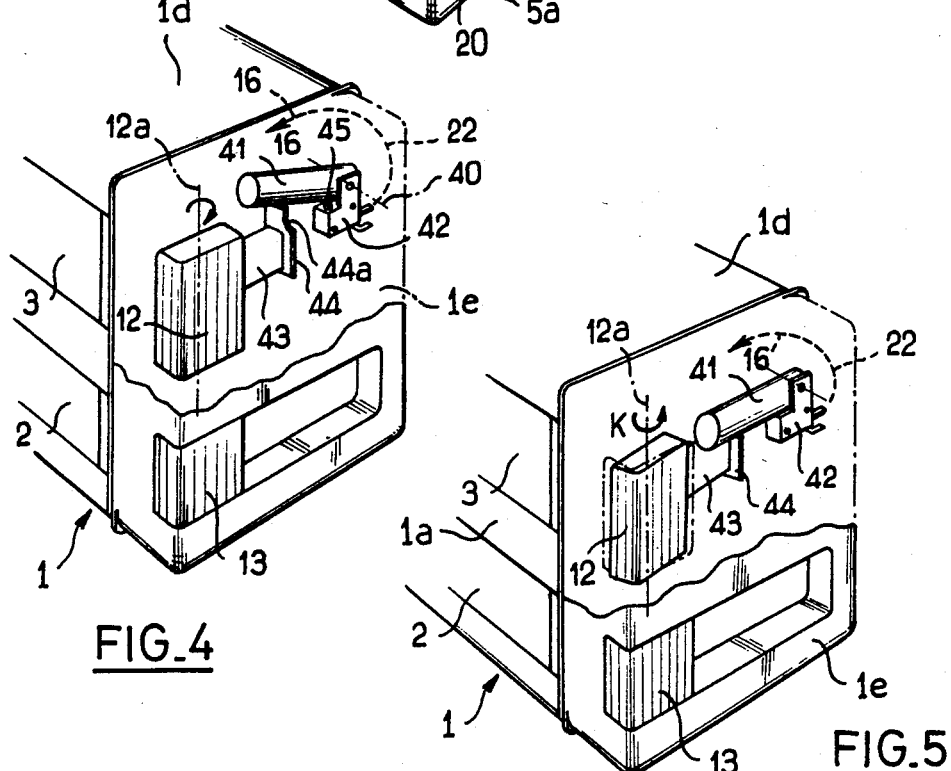
FIG. 4
FIG. 5

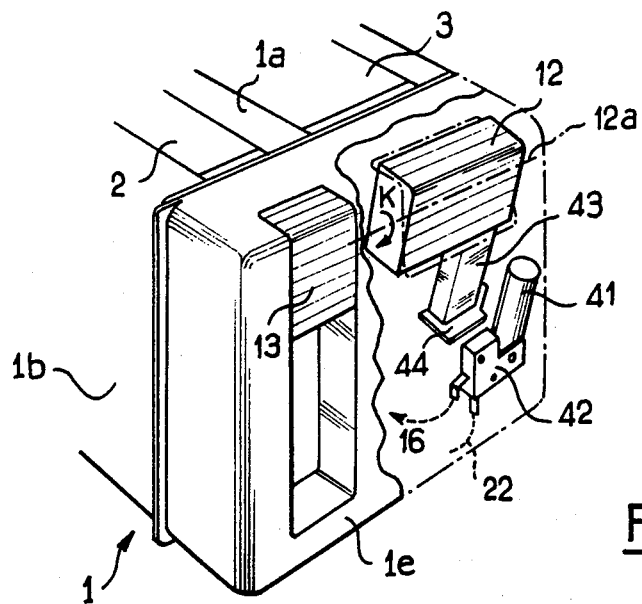
FIG. 6
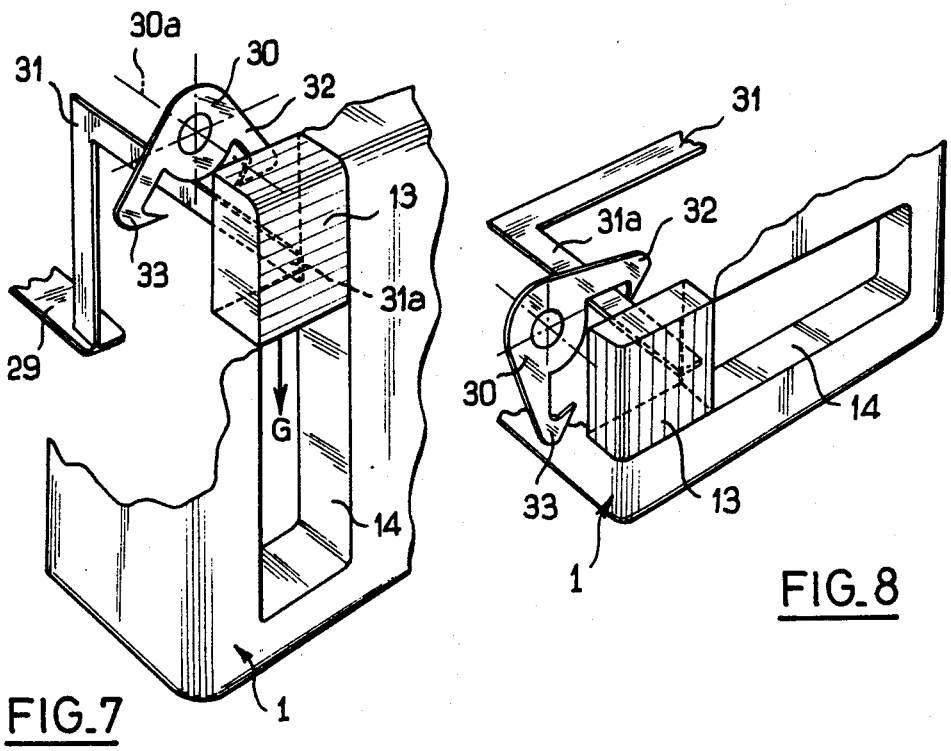
FIG. 7
FIG. 8

ELECTRIC HOUSEHOLD APPLIANCE COMBINING A TOASTER AND AN OVEN

The present invention relates to an electric household appliance which serves both as a toaster and as an oven, in particular an auxiliary oven.

Such an association of cooking functions in the same domestic appliance corresponds to the need to provide consumers with compact multipurpose electric household appliances.

Appliances combining the functions of toaster and oven have already been proposed. Certain types of appliances carry out toasting of bread and heating or cooking of dishes in the same compartment, in the same service position and with the same mode of heating. This arrangement has the merit of being compact but suffers from major disadvantages. In practice, toasting of bread calls for radiation having a short wavelength whereas heating and cooking require radiation of longer wavelength. Moreover, heating and cooking necessarily take place horizontally. However, in order to obtain good toasting distribution on both faces, the slice of bread must be placed in the vertical position. In consequence, appliances of this type are not capable of correctly performing both functions.

Other known appliances in which a toaster and an oven are combined have two compartments. The compartment in which toasting of the bread takes place is arranged vertically whilst the compartment which serves to heat the dishes is positioned horizontally. Appliances of this type correctly perform their two functions but have the disadvantage of being relatively cumbersome. The aim of the present invention is to solve the problem set forth in the foregoing by permitting perfect execution of the two oven and toaster functions with simple and reliable means while ensuring that the volume of the appliance remains as compact as possible.

In accordance with the invention, the domestic electric appliance which combines toasting of bread and cooking (or heating of dishes) is characterized in that it comprises separate elongated compartments which extend in parallel relation respectively for toasting and cooking, each of these compartments being provided with its own heating means, and that bearing means are also provided for tilting said compartments into positions located substantially at right angles to each other and corresponding to their normal respective operating positions.

Thus, while having a small overall size similar to that of the above-mentioned appliances which have only one compartment, this appliance achieves all the functions of an appliance having two compartments.

In a preferred embodiment, the compartments are placed in the vertical position for toasting bread and are placed horizontally by simple tilting of the appliance through 90° for cooking or heating, this tilting movement being performed by making use of the bearing means which permit this stable double positioning of the appliance.

In an advantageous embodiment of the invention, the appliance is provided with safety means for preventing the supply of electric power to the compartment which is not in its normal service position.

This accordingly avoids any abnormal or even dangerous use of the appliance or in other words prevents turn-on of the oven in the vertical position or the toaster in the horizontal position.

These safety means can consist in particular of switches placed in series with the push-button switches normally provided for manual control and said safety switches can be actuated either by the weight of the appliance or as a function of its orientation in space.

In another embodiment, the safety means are of the mechanical type, are controlled by gravity and are designed to neutralize the control push-buttons when the appliance is not in the normal position of utilization of the corresponding compartments.

Other particular features and advantages of the invention will further become apparent from the following description which now follows.

In the accompanying drawings which are given by way of example and not in any limiting sense, there has been shown one embodiment of the appliance in accordance with the invention and different safety devices.

FIG. 1 is a perspective view of the appliance in the toaster position.

FIG. 2 is a view which is similar to FIG. 1 and shows the appliance in the oven position.

FIG. 3 is a perspective view of the appliance in the position of FIG. 1 showing diagrammatically two safety devices.

FIG. 4 is a schematic view in perspective of one of the lateral faces of the appliance with the casing partially broken away, showing a pendulum-type safety device in cooperating relation with the control push-button of the oven compartment, the appliance being in the oven position and the oven-control push-button being in the non-engaged position.

FIG. 5 is a view which is similar to FIG. 4 and in which the oven-control push-button is in the engaged position.

FIG. 6 is a perspective view of the same pendulum-type safety device, the appliance being in the toaster position and the oven-control push-button being in the engaged position.

FIG. 7 is a partial schematic view in perspective showing a device for locking the control slide-block of the toaster compartment, the appliance being in the toasting position.

FIG. 8 is a perspective view of the same locking device, the appliance being in the oven position.

In the embodiment of the invention which is shown in FIGS. 1 and 2, the electric household appliance 1 which combines toasting of bread A with cooking or heating of dishes B (shown during introduction) has a generally parallelepipedal shape and has two separate elongated compartments 2, 3 which are also parallelepipedal, which extend in parallel relation to each other and are arranged respectively for toasting and cooking. These compartments 2 and 3 have volumes adapted to their functions, the opening 2a of the toaster 2 being of substantially smaller width than the opening 3a of the oven 3, these openings 2a and 3a being intended to open on the same face 1a of the appliance.

The compartment 2 is equipped in known manner with resistors arranged in flat layers or tubes 15 (see FIG. 3) which can be heated to bright redness, in which case they emit short-wave infrared radiation. The compartment 3 is also equipped in known manner with screened resistors or steatites 16 which are capable of emitting long-wave infrared rays.

The two circuits for supply of electric current to the resistors 15 and 16 are independent and, as will become apparent, means are provided for ensuring that they cannot operate simultaneously, irrespective of the position of the appliance 1. This latter is also provided with bearing means consisting of lateral ribs 4a, 5a and 4b, 5b which project from the consecutive faces 1b which is adjacent to 1a and 1c which is opposite to 1a. The ribs considered are arranged in the vicinity of the lateral faces 1e, 1f of the appliance. The ribs 4a and 5a are located in the line of extension of each other and thus form a right-angled bracket. The same applies to the ribs 4b, 5b. These ribs are obtained for example by suitably moulding the plastic casing of the appliance 1.

These bearing means make it possible by tilting the appliance 1 to present the compartments 2 and 3 in positions which are substantially at right angles to each other and correspond to their respective service position. FIG. 1 thus shows the appliance 1 resting on the bearing means 5a, 5b, the face 1c being located opposite to the bearing plane (not shown in the figure). The compartments 2 and 3 are then substantially vertical and have their openings 2a, 3a respectively on the top face of the appliance 1. In this position, the compartment 2 in which toasting is carried out is in the service position. FIG. 2 shows the appliance 1 after tilting through 90° in the direction F, the face 1b being then opposite to the bearing plane while the appliance rests on the ribs 4a, 4b.

In this position, compartments 2 and 3 are substantially horizontal and have their openings 2a, 3a on the front side of the appliance 1. The compartment 3 in which cooking takes place is in the service position.

The heating means 15 and 16 assigned to each compartment 2 and 3 are supplied by means of separate control devices 12 and 13 which are known per se and located on the same lateral face 1c of the appliance opposite to their respective compartment.

Supply of current to the resistors 15 of the toaster compartment 2 is thus controlled by a slideblock 13 which is displaceable along a groove 14 whilst supply of current to the resistors 16 of the cooking compartment 3 is controlled by a push-button switch 12.

Operation of such an appliance which combines a toaster and an oven is of great simplicity. The utilizer who desires to use the appliance 1 as a toaster places it on the ribs 5a and 5b so that the compartment 2 provided for toasting is oriented vertically, the opening 2a being located on the top face. This provides a conventional toaster. The user who now desires to employ the appliance 1 as an oven tilts this latter in the direction F on the bearing ribs 4a and 4b so as to ensure that the compartment 3 in which cooking takes place is in a horizontal plane. This provides a conventional oven.

The means provided by the invention, which have recourse to two separate and distinct bearing faces in contradistinction to conventional practice thus permit perfect execution of the two oven and toaster functions in a simple and reliable manner while ensuring that the volume of the appliance remains as compact as possible without increasing its cost price as a result of any structural complication.

In a preferred embodiment of the invention, the appliance is provided as a complementary feature with safety means for preventing operation of the means for heating a compartment when this latter is not in its normal service position so as to prevent any handling error. Preferably, these safety means must be as simple as possible in order to prevent any increase in capital cost of the appliance while conforming to prescribed safety standards.

In a first construction, these safety means comprise (FIG. 3) a switch 20 with push-button 21 placed on the circuit 22 for the supply of electric current to the resistors 16 of the cooking compartment 3 and in series with the manual control switch of these resistors, the actuating push-button of which is shown at 12 in FIGS. 1 and 2.

The push-button 21 normally projects relative to the rib 4a; in this position, the switch 20 is open, with the result that the resistors 16 of the oven 3 cannot be supplied. On the contrary, the push-button 21 closes the switch 20 and permits supply when the appliance bears on the ribs 4a, 4b (oven position).

Similar means can advantageously be provided along one of the ribs 5a or 5b for controlling the supply of the resistors 15 of the toaster 2.

In FIG. 3, there has been shown by way of alternative a second electric safety means of the pendular type which can be employed in either or both of the heating circuits 15, 16. The sensitive element of this safety means comprises a pendulum 25 which is capable of moving about a pivot-pin 26 and which is capable of controlling into the active position a switch 27 normally-open under the action of a spring 28, this switch being placed on the supply circuit 22 of the resistors 16 of the oven 3 in the example described.

When the appliance is in the toaster position (FIG. 3), the pendulum 25 is moved away from the switch 27, thus cutting-off the supply of current to the resistors 16. The travel of the pendulum 25 is limited by a stop 29. Should the appliance be tilted in the direction F in order to bring it to the oven position, the pendulum 25 accordingly closes the switch 27. Manual action on the push-button 12 then permits heating of the oven 3.

The positive safety system hereinabove described of the type comprising two switches in series for each circuit is perfectly reliable. It has the disadvantage, however, of somewhat increasing the cost price of the appliance.

There will now be described simplified safety systems which make it possible to provide only one switch per circuit.

The systems in question are preferably specifically provided for control of the oven 3 (embodiments of FIGS. 4 to 6) and for control of the toaster (embodiment of FIGS. 7 and 8).

The safety means for the oven 3 as represented schematically in FIGS. 4, 5 and 6 comprise a microswitch 42 placed on the electric current supply circuit 22 of the resistors 16. The microswitch 42 comprises a push-button 45 which projects in the open position and is directed upwards when the appliance is in the oven position (FIG. 4). A heavy lever 41 forming a pendulum is mounted on the casing of the microswitch 42 so as to be capable of rotating about an axis 40 which is parallel to the longitudinal axis of the appliance 1. The lever 41 is so arranged that, when the appliance 1 is in the oven position, its own weight has the effect of depressing the push-button 45 (FIG. 5) so as to close the circuit 22.

So far as the control push-button 12 of the oven 3 is concerned, this push-button is mounted so as to be capable of pivoting about an axis 12a at right angles to the faces 1b, 1d and has an extension in the form of a lug 43 terminating in a transverse cam 44 which is adapted to cooperate with the free end of the lever 41. The cam 44 has a lateral recess 44a located beyond the lever 41 when the push-button 12 is at rest (position of FIG. 4). The microswitch 42 is placed in the vicinity and in the line of extension of the lug 43 so that, once the appliance 1 is in the oven position, the free end of the lever 41 is abuttingly applied against the cam 44, thus allowing the push-button 45 to project beneath said lever.

If, in order to turn-on the oven 3, the control push-button 12 (FIG. 5) is engaged, this latter pivots in the direction K about the axis 12a as well as the lug 43 and the cam 44, the recess 44a of which permits pivotal displacement of the heavy lever 41. This latter is subsequently applied against the push-button 45, thus resulting in closure of the circuit 22 and permitting the supply of current to the resistors 16 (FIG. 5).

In order to turn-off the oven, the control push-button 12 is restored to its initial position by a thrust exerted in the direction opposite to K. The ramp of the recess 44a of the cam 44 lifts the lever 41 which once again rests on the horizontal edge of said cam, thus freeing the push-button 45, which opens the circuit 22.

When the appliance is in the toaster position (FIG. 6), the pendulum-forming lever 41 is constrained by its own weight to move away from the push-button 45, with the result that this latter cannot be depressed; the circuit 22 is therefore open irrespective of the position of the control push-button 12 of the oven, even if this latter is inadvertently depressed and has rotated in the direction K as shown in FIG. 6.

A less complete safety system can be provided for the toaster by simple mechanical locking as will be seen with reference to FIGS. 7 and 8. This embodiment relates to the conventional case in which the compartment 2 for toasting bread has a movable basket shown partially and schematically at 29 and rigidly fixed to a right-angled support bracket 31 terminating in a control slide-block 13 which is displaceable on one side of the compartment 2 within a groove 14.

In a known manner, the fact that the slideblock 13 is actuated in the direction G in order to bring it to the bottom position also initiates the supply of current to the heating resistors 15. The safety means provided within the scope of this structure comprise a hook 30 which pivots about an axis 30a parallel to the longitudinal axis of the appliance 1 and located above the horizontal rod 31a of the right-angled support bracket 30 when the appliance is in the toaster position (FIG. 7).

This hook 30 has two arms 32 and 33 forming a jaw, the ends of which are bent inwards and leave between them a passageway of sufficient width for the rod 31a of the right-angled support bracket 31 in the position aforesaid whilst the hook 30 is in stable equilibrium. By displacing the slide-block 13 in the downward direction, it is thus possible to lower the basket 29 and to turn-on the switch (not shown) for supplying the resistors 15.

When the appliance 1 is tilted horizontally in order to employ the compartment 3, the hook 30 pivots and locks the rod 31a of the slide-block 13 by means of one of its inwardly-bent arms 32 or 33 (depending on the direction of pivotal displacement of the appliance), thus prohibiting the use of the compartment 2. When the appliance 1 is restored to its upright position, the hook 30 again pivots in order to return to the position of FIG. 7 and releases the slide-block 13.

It is apparent that the invention is not limited to the embodiments described and that alternative forms of construction may be added thereto. Thus, in order to facilitate pivotal displacement of the appliance in the direction F, the lateral faces of the appliance could be provided with handles shown diagrammatically at 71 or at 72 in FIG. 1.

Similarly, the switches of the pendular type can be of the mercury-tube type.

We claim:

1. Domestic electric appliance which combines toasting of bread and cooking or heating of dishes, comprising:
   separate elongated compartments extending parallel in a fixed relationship to one another, respectively for toasting and cooking;
   in each said compartment, specific heating means respectively for toasting and cooking; and
   bearing means allowing tilting said compartments into two positions located substantially at right angles to each other and corresponding to their normal respective positions of operation.

2. Appliance in accordance with claim 1, having a substantially parallelepipedal shape, wherein said compartments each have their opening on the same face of the appliance and wherein the bearing means are disposed on the face opposite to these openings and on an intermediate adjacent face between the face aforesaid and said openings.

3. Appliance in accordance with claim 2, wherein the bearing means comprise parallel ribs disposed in the vicinity of the lateral faces of the appliance, these ribs being formed on two consecutive of the large faces.

4. Appliance in accordance with claim 1, comprising safety means for preventing the supply of electric power to that compartment which is not in its normal operating position.

5. Appliance in accordance with claim 4 in which the compartment for toasting bread has a movable basket actuated by a slide-block which is capable of displacement on one side of the compartment, actuation of this slide-block being also intended to initiate supply of current to the heating means of the compartment, wherein the safety means comprise a hook which oscillates as a function of the orientation of the appliance, the slide-block being locked in the inactive position by said hook when said compartment is not in its natural operating position.

6. Domestic electric appliance which combines toasting of bread and cooking or heating of dishes, comprising:
   separate elongated compartments extending parallel in a fixed relationship to one another, respectively for toasting and cooking;
   in each said compartment, specific heating means respectively for toasting and cooking;
   bearing means allowing tilting said compartments into two positions located substantially at right angles to each other and corresponding to their normal respective positions of operation;
   push-button switches for manual control of said heating-means; and
   safety means for preventing the supply of electric power to that compartment which is not in its normal operating position, consisting of safety switches placed in series with said push-button switches, said safety switches being controlled by the weight of the pivoting appliance or by means which are sensitive to its orientation in space.

7. Domestic electric appliance which combines toasting of bread and cooking or heating of dishes, comprising separate elongated compartments extending in parallel relation respectively for toasting and cooking, each of said compartments being provided with its own heating means, manually operable control means for said heating means, bearing means for tilting said compartments into positions located substantially at right angles to each other and corresponding to their normal respective positions of operation, and safety means for preventing the supply of electric power to that compartment which is not in its normal operating position, said safety means being mechanical and being controlled by gravity and adapted to neutralize at least part of the manually operable control means when the appliance is not in the normal position of utilization of the corresponding compartment.

8. Domestic electric appliance which combines toasting of bread and cooking or heating of dishes, comprising separate elongated compartments extending in parallel relation respectively for toasting and cooking, each of said compartments being provided with its own heating means, bearing means for tilting said compartments into positions located substantially at right angles to each other and corresponding to their normal respective positions of operation, and safety means for preventing the supply of electric power to that compartment which is not in its normal operating position, said safety means comprising at least one switch mounted on an electric supply circuit of one of said compartments, a push-button of said switch being positioned to project relative to the bearing means and to be actuated so as to open the switch when the compartment controlled by said switch is not in the service position.

9. Domestic electric appliance which combines toasting of bread and cooking or heating of dishes, comprising separate elongated compartments extending in parallel relation respectively for toasting and cooking, each of said compartments being provided with its own heating means, bearing means for tilting said compartments into positions located substantially at right angles to each other and corresponding to their normal respective positions of operation, safety means for preventing the supply of electric power to that compartment which is not in its normal operating position, said safety means comprising at least one switch mounted on the electric supply circuit of one of said compartments, said switch being controlled by a pendulum whose angular position depends on that of the appliance, said pendulum being operative to open the switch when the compartment controlled by said switch is not in its normal position of operation.

10. Appliance in accordance with claim 9, wherein the push-button for manual control of the heating circuit of one of the compartments comprises means such as a cam for controlling the corresponding switch by means of the pendulum, the mechanical connection between the push-button and the pendulum being neutralized when the appliance is not in the intended position for putting the heating circuit considered into service.

* * * * *